(12) United States Patent
Chuang et al.

(10) Patent No.: US 11,467,687 B2
(45) Date of Patent: Oct. 11, 2022

(54) TOUCH DISPLAY APPARATUS, DRIVING CIRCUIT AND METHOD FOR AUTOMATIC DEFECT DETECTION

(71) Applicant: HIMAX TECHNOLOGIES LIMITED, Tainan (TW)

(72) Inventors: Chun-Kai Chuang, Tainan (TW); Yu-Ming Liao, Tainan (TW); Pei-Yuan Hung, Tainan (TW); Yu-Hsiang Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/445,733

(22) Filed: Aug. 24, 2021

(65) Prior Publication Data

US 2022/0066586 A1    Mar. 3, 2022

Related U.S. Application Data

(60) Provisional application No. 63/069,724, filed on Aug. 25, 2020.

(51) Int. Cl.
*G06F 3/041*  (2006.01)
*G09G 3/00*  (2006.01)

(52) U.S. Cl.
CPC ........ *G06F 3/0412* (2013.01); *G06F 3/04166* (2019.05); *G09G 3/006* (2013.01)

(58) Field of Classification Search
CPC .... G06F 3/0412; G06F 3/04166; G09G 3/006
See application file for complete search history.

(56) References Cited

U.S. PATENT DOCUMENTS

2016/0364068 A1*  12/2016  Cheng ................... G06F 3/0412
2017/0205956 A1*  7/2017  Li ........................... G09G 3/006

FOREIGN PATENT DOCUMENTS

| CN | 108628488 A | 10/2018 |
|---|---|---|
| CN | 111309173 A | 6/2020 |
| TW | I588502 B | 6/2017 |
| TW | I588694 B | 6/2017 |

* cited by examiner

*Primary Examiner* — Hang Lin
(74) *Attorney, Agent, or Firm* — CKC & Partners Co., LLC

(57) ABSTRACT

A touch display apparatus is disclosed, which includes a touch display panel and a driving circuit coupled to the touch display panel. The touch display panel is configured for display and touch sensing, and includes plural touch sensing pads. The driving circuit is configured to provide a voltage signal with a test pattern to the touch sensing pads, and is configured to determine whether an open circuit or a short circuit exists in the touch display panel from a detected signal in response to the voltage signal.

17 Claims, 12 Drawing Sheets

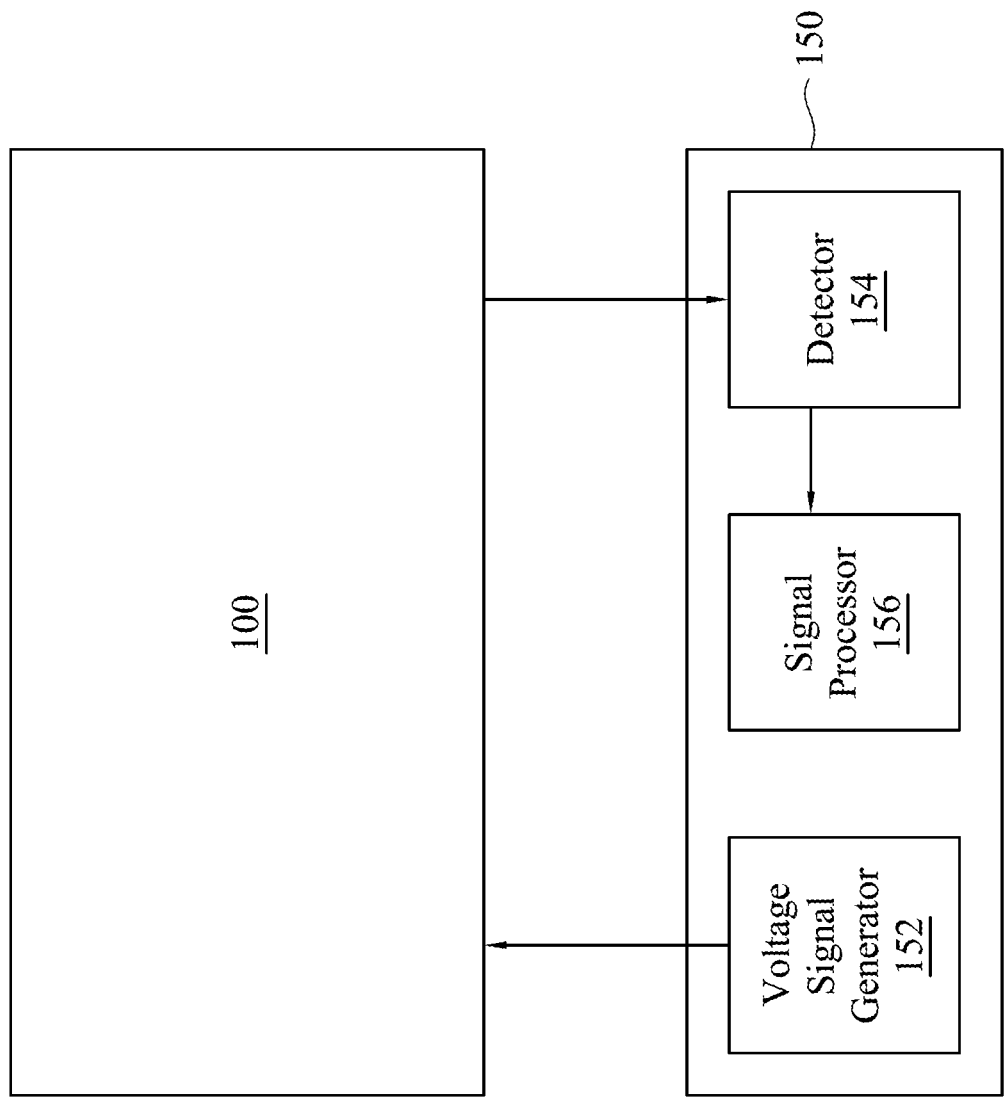

TOUCH DISPLAY APPARATUS, DRIVING CIRCUIT AND METHOD FOR AUTOMATIC DEFECT DETECTION

RELATED APPLICATIONS

This application claims priority to U.S. Provisional Application Ser. No. 63/069,724, filed Aug. 25, 2020, which is herein incorporated by reference.

BACKGROUND

Field of the Invention

The invention relates a touch display apparatus, a driving circuit and a method for automatic defect detection on a touch display panel.

Description of Related Art

With the advance of electronic product manufacturing technologies, more and more electronic devices, such as smartphones and tablets, have employed touch function as well as display function for facilitating user operations. However, an electronic device with a touch function may encounter touch detection failure due to a hardware defect or a software error. If the touch detection failure occurs due to a hardware defect, a detailed inspection by a human or an external instrument is usually required for determining the root cause of the hardware defect, which is inefficient and time-consuming.

SUMMARY

One aspect of the invention is directed to a touch display apparatus which includes a touch display panel and a driving circuit coupled to the touch display panel. The touch display panel is configured for display and touch sensing, and includes plural touch sensing pads. The driving circuit is configured to provide a voltage signal with a test pattern to the touch sensing pads, and is configured to determine whether an open circuit or a short circuit exists in the touch display panel from a detected signal in response to the voltage signal.

In accordance with one or more embodiments of the invention, the driving circuit determines that an open circuit exists in the touch display panel if a voltage level of the detected signal rises faster than a normal condition of the touch display panel.

In accordance with one or more embodiments of the invention, the driving circuit determines that a short circuit exists in the touch display panel if a voltage level of the detected signal rises slower than a normal condition of the touch display panel and does not keep at a listening voltage.

In accordance with one or more embodiments of the invention, the driving circuit is configured to sample the detected signal at a sampling time interval to obtain sampled values, and to determine whether an open circuit or a short circuit exists in the touch display panel by comparing the sampled values with a listening voltage. The driving circuit determines that an open circuit exists in the touch display panel if the number of sampled values lower than the listening voltage is smaller than a lower bound of a count value range. The driving circuit determines that a short circuit exists in the touch display panel if the number of sampled values lower than the listening voltage is larger than an upper bound of the count value range.

In accordance with one or more embodiments of the invention, the driving circuit is configured to provide a voltage signal with a test pattern to the touch sensing pads after normal touch sensing operations on the touch display panel in the same frame period.

In accordance with one or more embodiments of the invention, the driving circuit is configured to provide the voltage signal with the test pattern to a first group of the touch sensing pads and provide a ground signal to a second group of the touch sensing pads in a first frame period, and to provide the ground signal to the first group of the touch sensing pads and provide the voltage signal with the test pattern to the second group of the touch sensing pads in a second frame period.

In accordance with one or more embodiments of the invention, the touch display panel is an in-cell type touch display panel.

In accordance with one or more embodiments of the invention, the driving circuit is a touch and display driving integration (TDDI) circuit.

Another aspect of the invention is directed to a driving circuit adapted to drive a touch display panel with plural touch sensing pads. The driving circuit includes a voltage signal generator, a detector and a signal processor. The voltage signal generator is configured to provide a voltage signal with a test pattern to the touch sensing pads. The detector is configured to obtain a detected signal in response to the voltage signal. The signal processor is configured to determine whether an open circuit or a short circuit exists in the touch display panel from the detected signal.

Yet another aspect of the invention is directed to method for automatic defect detection on a touch display panel with plural touch sensing pads. The method includes: providing a voltage signal with a test pattern to the touch sensing pads; obtaining a detected signal in response to the voltage signal; and determining whether an open circuit or a short circuit exists in the touch display panel from the detected signal.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

FIG. 1C is a schematic block diagram of the driving circuit in FIG. 1B.

DETAILED DESCRIPTION

Figure 1A:
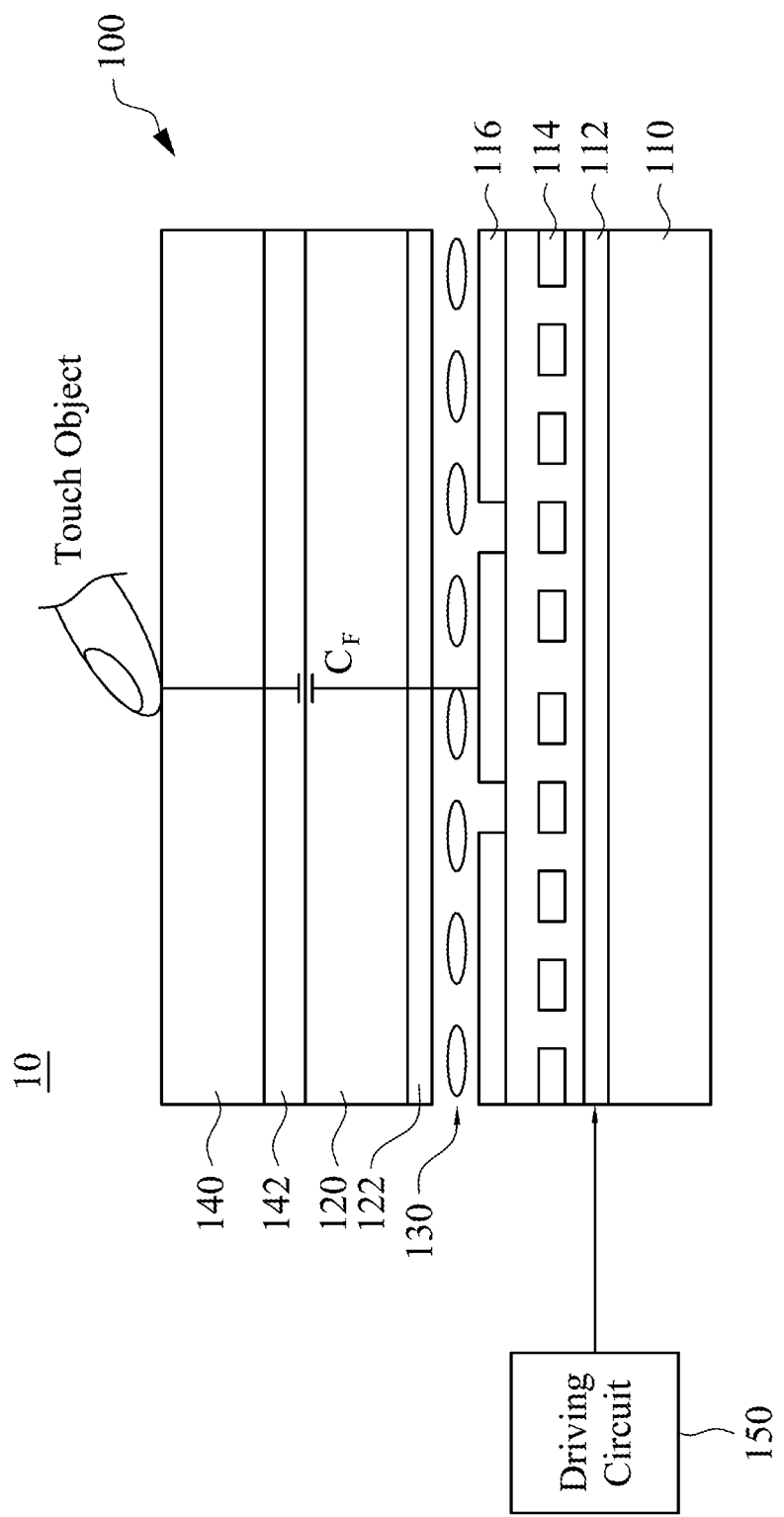
FIG. 1A is a schematic cross sectional view of a touch display apparatus in accordance with some embodiments of the invention.

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

The document may repeat reference numerals and/or letters in the various examples. This repetition is for the purpose of simplicity and clarity and does not in itself dictate a relationship between the various embodiments and/or configurations discussed.

Referring to FIG. 1A, FIG. 1A is a schematic cross-sectional view of a touch display apparatus 10 in accordance with some embodiments of the invention. The touch display apparatus 10 includes a touch display panel 100 and a driving circuit 150 configured to drive the touch display panel 100 to perform display as well as touch sensing. The touch display panel 100 is an in-cell type touch display panel, and in the touch display panel 100, a thin-film transistor (TFT) substrate 110 and a color filter (CF) substrate 120 are oppositely disposed, and a liquid crystal layer 130 is disposed between the TFT substrate 110 and the CF substrate 120. Scan lines 112, data lines 114, pixel TFTs (not shown), pixel electrodes (not shown) and common electrodes (i.e. of a touch sensing layer 116) are disposed on the TFT substrate 110 for display. The touch sensing layer 116 is also used for touch sensing (e.g. detection of a touch event by a touch object). A color filter layer 122 is disposed on the CF substrate 120, and has color filter units each corresponding to one of pixels of the touch display panel 100 for passing light with a specific color. A cover substrate 140 adheres to the CF substrate 120 via an adhesive layer 142 therebetween for providing at least a protection function and a touch operation interface. As shown in FIG. 1A, a capacitance $C_F$ is measured when a touch object touches the surface of the cover substrate 140. The touch object may be a person's finger, a touch pen, or another suitable object. The driving circuit 150 is electrically connected to the touch display panel 100 for touch driving. The driving circuit 150 may be a touch and display driving integration (TDDI) circuit or several circuits which are capable of cooperatively perform display driving as well as touch driving on the touch display panel 100.

Figure 1B:
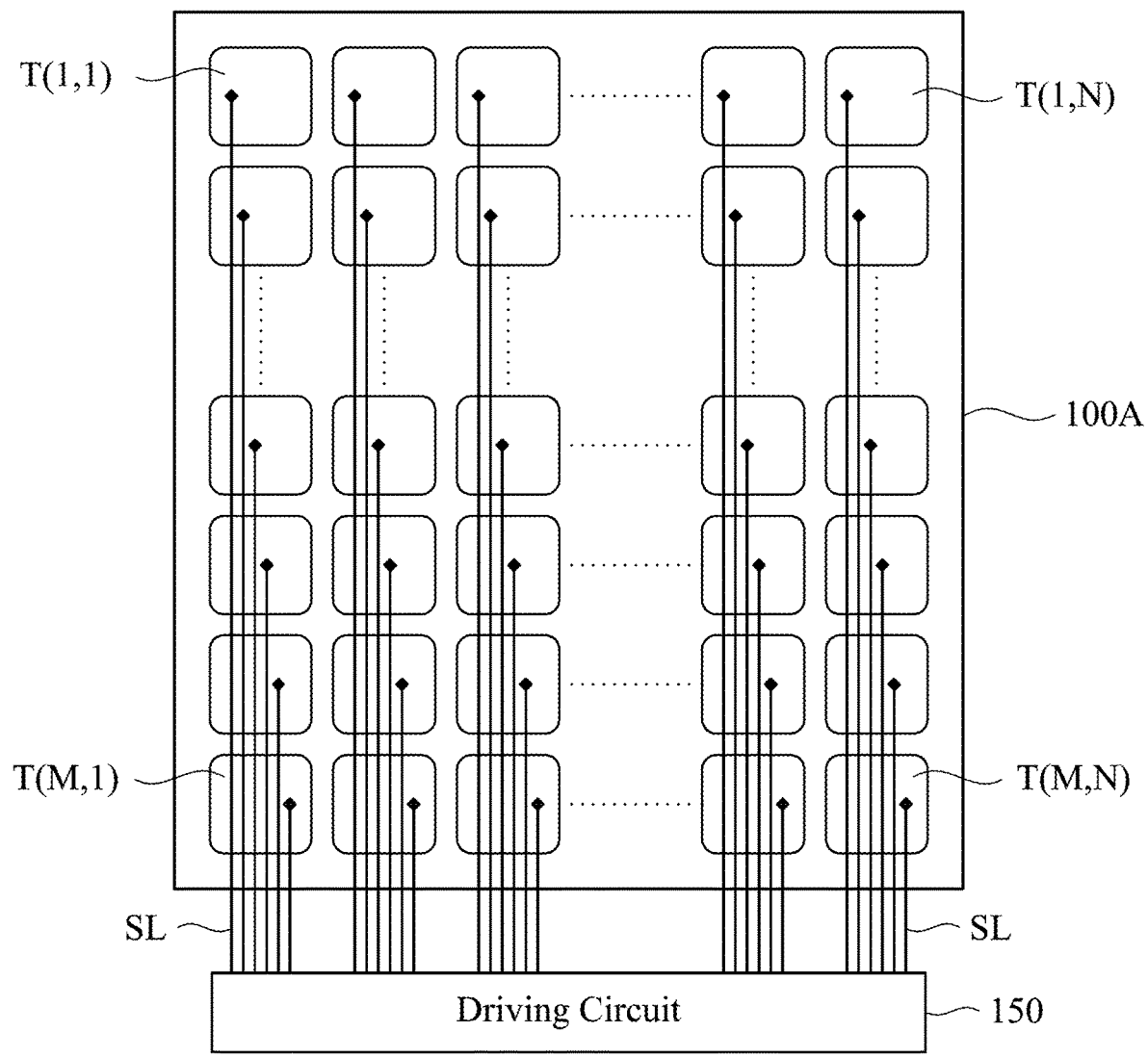
FIG. 1B is a schematic view of touch sensing pads of the touch sensing layer in FIG. 1A in accordance with some embodiments of the invention.

FIG. 1B is a schematic view of touch sensing pads $T(1,1)$-$T(M,N)$ of the touch sensing layer 116 in accordance with some embodiments of the invention. The touch sensing pads $T(1,1)$-$T(M,N)$ may be, as shown in FIG. 1B, arranged in a touch active area 100A of the touch display panel 100 in a form of M×N array. The touch active area 100A is also a display area which is configured for displaying images. Each of the touch sensing pads $T(1,1)$-$T(M,N)$ may be formed of the common electrodes of plural pixels in a particular block. Signal lines SL are respectively coupled to the touch sensing pads $T(1,1)$-$T(M,N)$, and the touch sensing pads $T(1,1)$-$T(M,N)$ are electrically connected to the driving circuit 150 respectively through the signal lines SL.

FIG. 1C is a schematic functional block diagram of the driving circuit 150 in FIG. 1B. The driving circuit 150 includes a voltage signal generator 152, a detector 154 and a signal processor 156. The voltage signal generator 152 is configured to provide a voltage signal to the touch sensing pads $T(1,1)$-$T(M,N)$ in the touch active area 100A for sensing. The detector 154 is configured to perform sensing on the touch sensing pads $T(1,1)$-$T(M,N)$ to obtain a detected signal based on the voltage signal provided by the voltage signal generator 152. The signal processor 156 is configured to process on the detected signal to determine information including a touch event.

The driving circuit 150 may further include other components for driving the touch display panel 100. For example, in some embodiments, the driving circuit 150 further includes a timing controller, a data driver and a scan driver for display driving on the touch display panel 100.

Figure 2A:
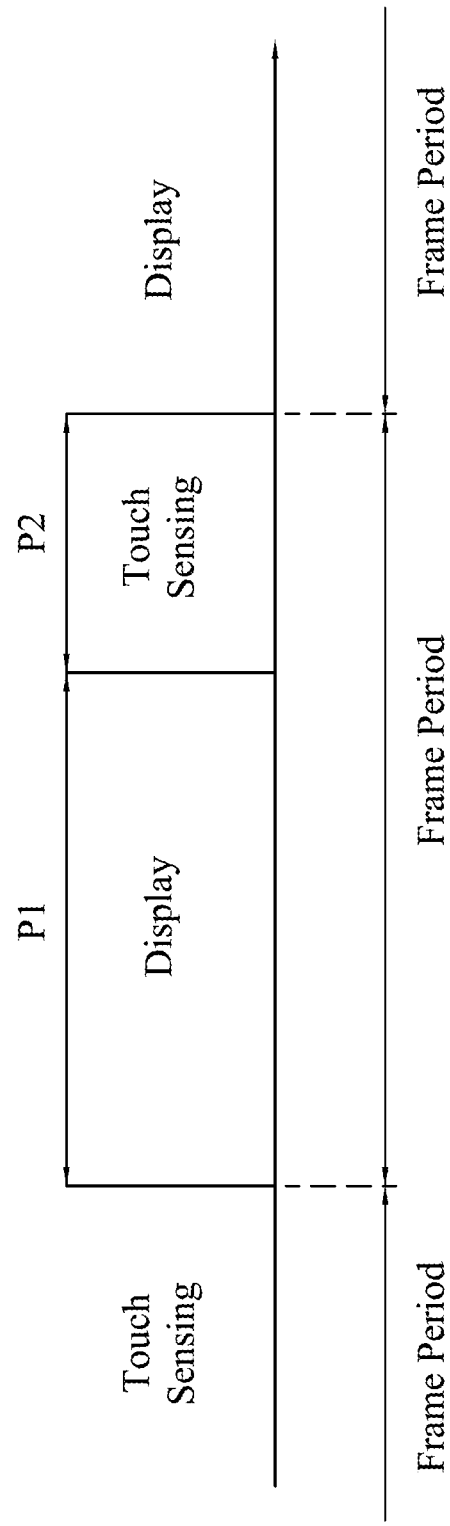
FIG. 2A is a schematic diagram showing a time sequence of operation of the touch display panel of FIG. 1A in accordance with some embodiments of the invention.

FIG. 2A is a schematic diagram showing a time sequence of operation of the touch display panel 100 in accordance with some embodiments of the invention. Each frame period of the touch display panel 100 includes a display stage P1 and a touch sensing stage P2. The display stage P1 and the touch sensing stage P2 of the same frame period may be non-overlapped. In the display stage P1, the driving circuit 150 provides the voltage signal with a direct current (DC) common voltage to the touch display panel 100 for display. Then, in the touch sensing stage P2, the driving circuit 150 provides the voltage signal to the touch display panel 100 for touch sensing. The common voltage signal applied to the touch display panel 100 during the display stage P1 may be a direct current signal, and the touch detection signal applied to the touch display panel 100 during the touch sensing stage P2 may be an alternate current (AC) voltage signal with a sinusoidal waveform, a triangle waveform, a sawtooth waveform, a trapezoidal waveform, or the like.

Figure 2B:
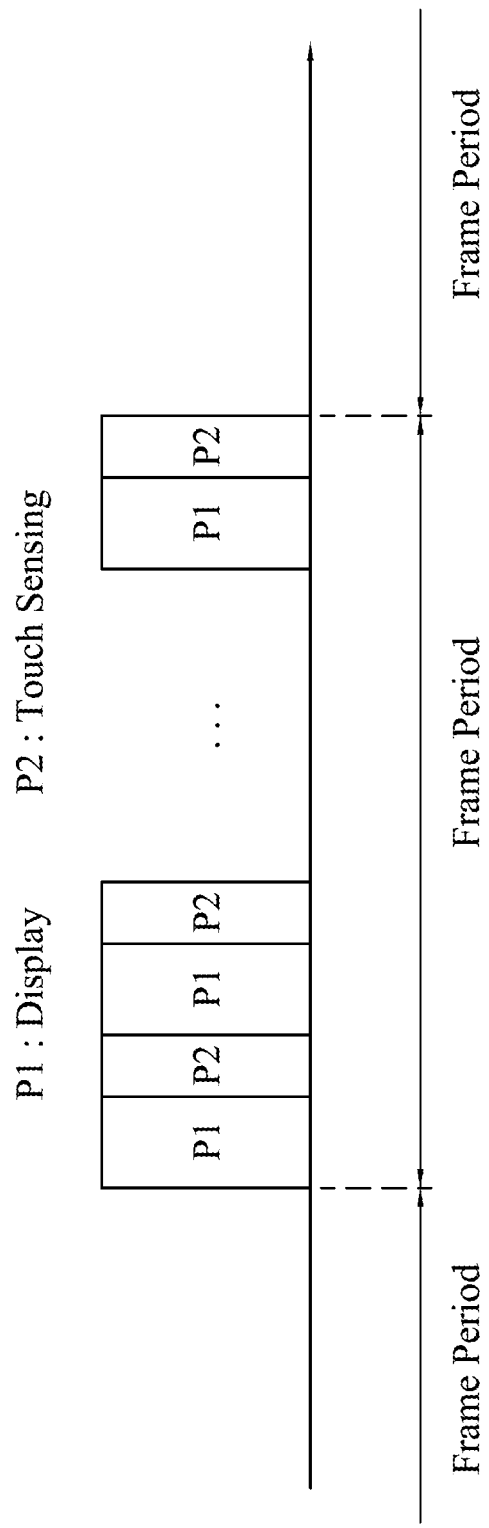
FIG. 2B is a schematic diagram showing a time sequence of operation of the touch display panel of FIG. 1A in accordance with some other embodiments of the invention.

Each frame period of the touch display panel 100 may include plural display stages P1 and plural touch sensing stages P2 in accordance with some other embodiments of the invention. As shown in FIG. 2B, the display stages P1 and the touch sensing stages P2 are alternately arranged in the same frame period. A full image display of the touch display panel 100 in each frame period may be separated into plural parts which are performed respectively in the display stages P1. Similarly, a full touch sensing of the touch display panel 100 in each frame period may be separated into plural parts which are performed respectively in the touch sensing stages P2.

Figure 3:
FIG. 3 is a partition of the touch active area shown in FIG. 1B in accordance with one implementation of the invention.

FIG. 3 is a partition of the touch active area 100A shown in FIG. 1B in accordance with one implementation of the invention. As shown in FIG. 3, the touch active area 100A is partitioned into subareas TA1-TA8. The subareas TA1-TA8 may be configured to perform touch sensing in different stages of each frame period. For the arrangement shown in FIG. 2B, the subareas TA1-TA8 may respectively correspond to the touch sensing stages P2. For example, if there are 10 touch sensing stages P2 in the frame period, the subareas TA1-TA8 may respectively corresponding to the first to fourth and the sixth to ninth touch sensing stages P2, and none of the subareas TA1-TA8 is configured to perform touch sensing in the fifth or tenth touch sensing stage P2.

Figure 4:
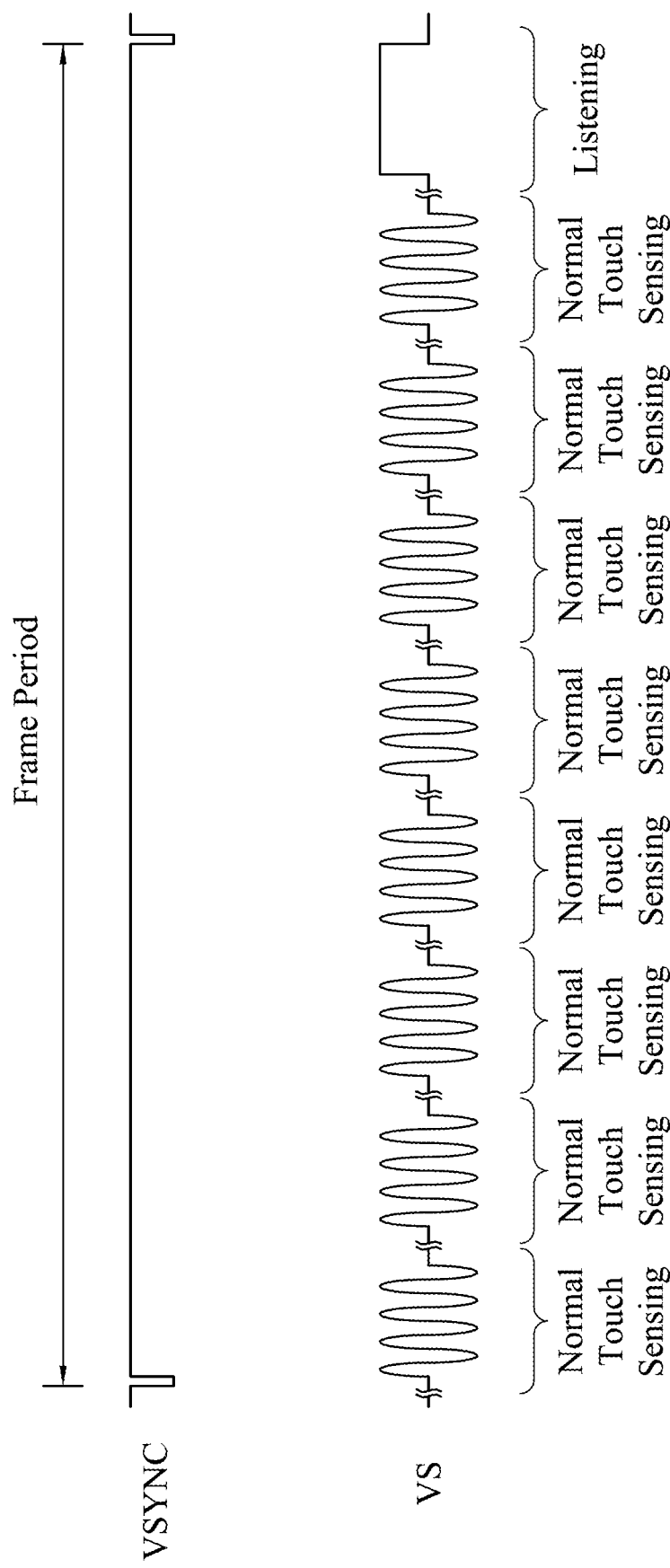
FIG. 4 conceptually illustrates a timing diagram of the voltage signal applied to the touch sensing pads in a frame period of the touch display panel 100 in FIG. 1A.

FIG. 4 conceptually illustrates a timing diagram of the voltage signal applied to the touch sensing pads T(1,1)-T(M,N) in a frame period of the touch display panel 100. As shown in FIG. 4, there are eight normal touch sensing periods and one listening stage in a frame period. Each frame period starts when a pulse of the synchronization signal VSYNC occurs, and ends when the next pulse of the synchronization signal VSYNC occurs. In each normal touch sensing period, the driving circuit 150 provides the voltage signal VS to the touch display panel 100 with a periodic sinusoidal waveform for touch detection, while in the listening period, the driving circuit 150 provides sensing signals to the touch display panel 100 with a test pattern for defect detection. In particular, the listening period is arranged after the normal touch sensing periods for determining whether an open circuit or a short circuit associated with the touch sensing pads T(1,1)-T(M,N) exists. The test pattern may be a rectangular waveform or another waveform different from the periodic sinusoidal waveform. The defect detection function performed in the listening stage does not affect the touch sensing function in the normal touch sensing periods.

Figure 5:
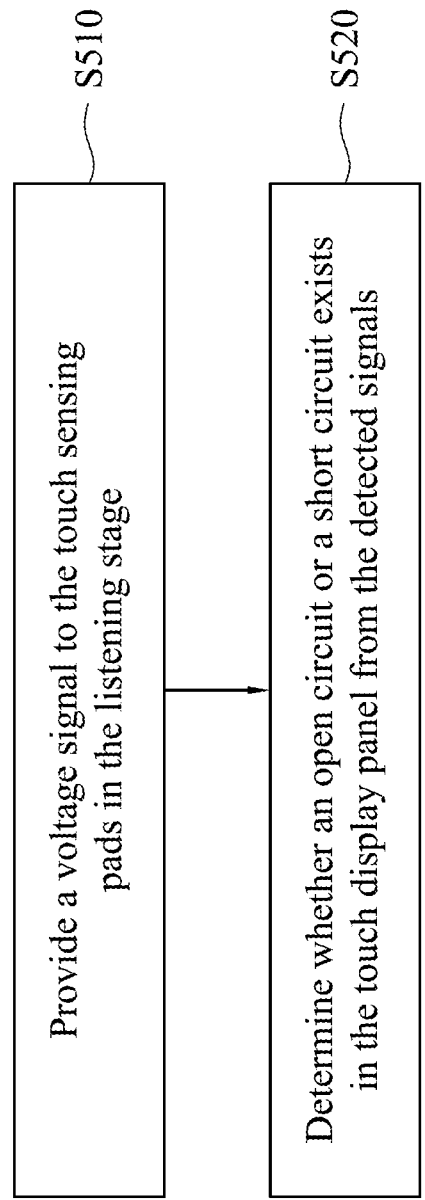
FIG. 5 is a flowchart of a defect detection method in accordance with some embodiments of the invention.

FIG. 5 is a flowchart of a defect detection method 500 in accordance with some embodiments of the invention. The defect detection method 500 may be applied to the touch display apparatus 10 or another similar touch display apparatus. The defect detection method 500 applied to the touch display apparatus 10 is exemplified for the description as follows. In Step S510, the voltage signal generator 152 provides a voltage signal VS with a test pattern to the touch sensing pads T(1,1)-T(M,N) in the listening stage. The test pattern of the voltage signal VS may be a rectangular waveform as shown in FIG. 4. In Step S520, the detector 154 obtains a detected signal in response to the voltage signal VS through the signal lines SL, and the signal processor 156 determines whether an open circuit or a short circuit exists in the touch display panel 100 from the detected signal.

Figure 6A:
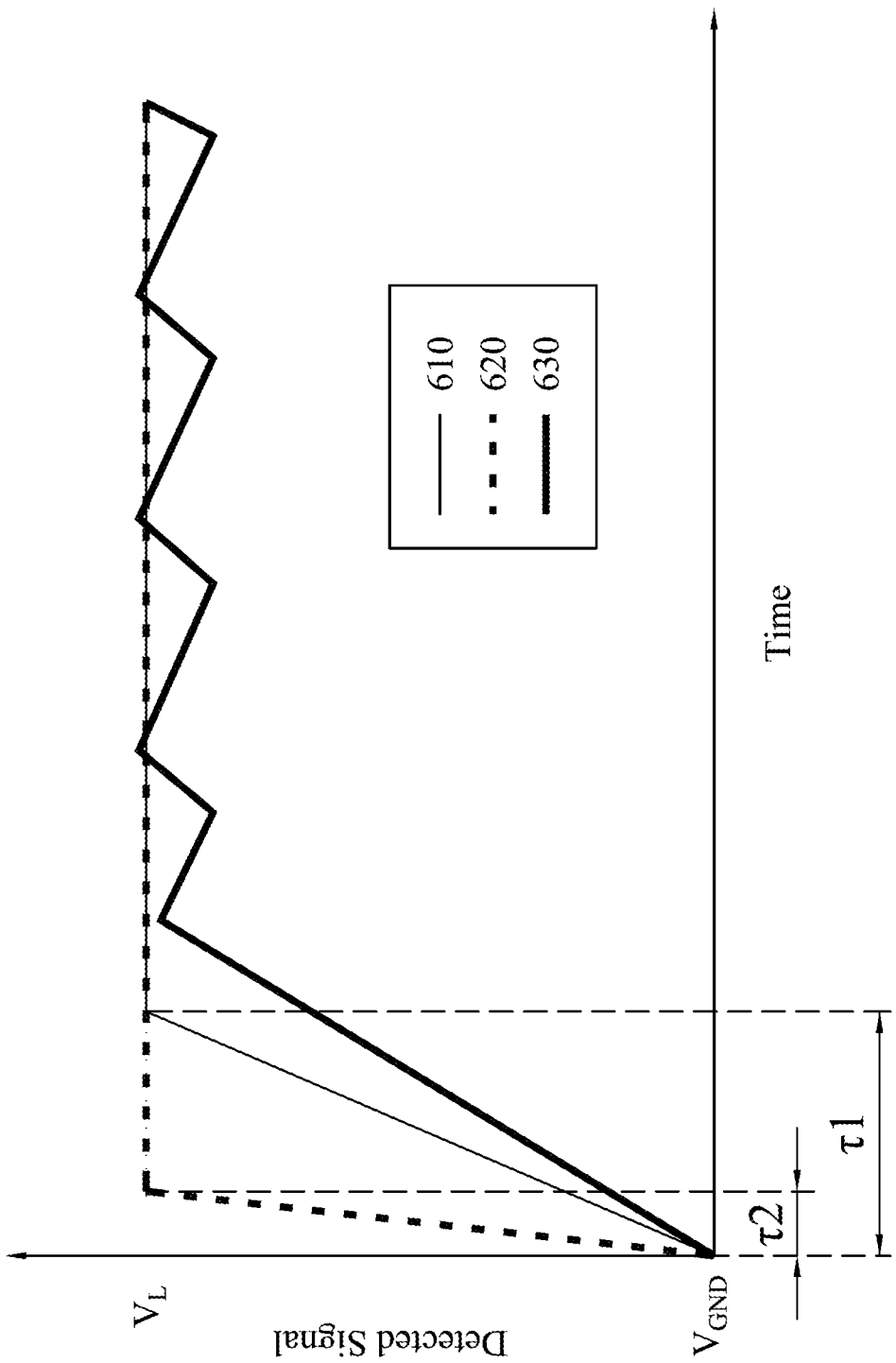
FIG. 6A illustratively shows a timing graph of the detected signal obtained by the detector in FIG. 1C respectively corresponding to various conditions of the touch display panel in FIG. 1A.

FIG. 6A illustratively shows a timing graph of the detected signal obtained by the detector 154 respectively corresponding to various conditions of the touch display panel 100. In FIG. 6A, the curve 610 represents the touch sensing function of the touch display panel 100 is normal, the curve 620 represents the touch display panel 100 has an open circuit, and the curve 630 represents the touch display panel 100 has a short circuit. As can be seen from FIG. 6A, in normal cases of the touch display panel 100, the voltage level of the detected signal rises from the ground voltage $V_{GND}$ to the listening voltage $V_L$ in a time duration $\tau 1$, and then voltage level of the detected signal keeps at the listening voltage $V_L$. If the detected signal has the curve 620 during the listening stage, the voltage level of the detected signal rises from the ground voltage $V_{GND}$ to the listening voltage $V_L$ in a time duration $\tau 2$ significantly shorter than the time duration $\tau 1$ (i.e. rises significantly faster than that of the curve 610), and the signal processor 156 may determine that an open circuit exists in the touch display panel 100. If the detected signal has the curve 630 during the listening stage, the voltage level of the detected signal rises slower than that of the curve 610 and does not keep at the listening voltage $V_L$, and the signal processor 156 may determine that a close circuit exists in the touch display panel 100.

Figure 6C:
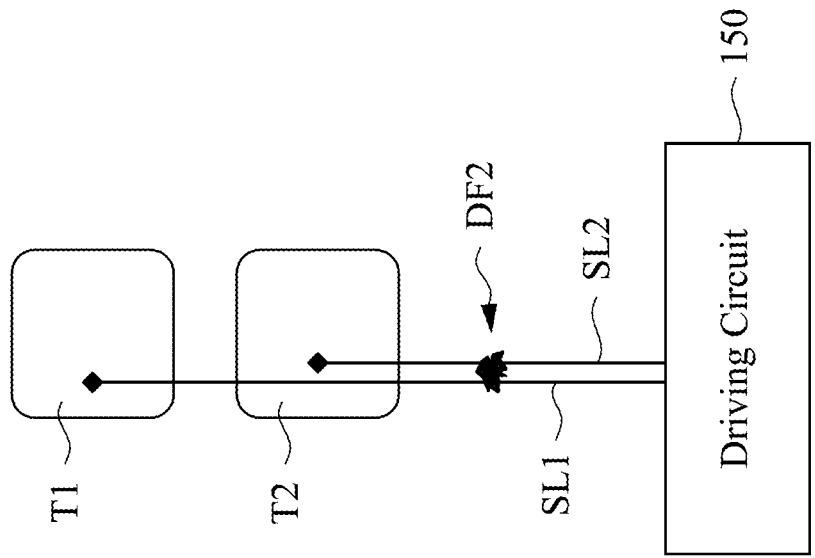
FIG. 6C illustrates a short circuit defect in the touch display panel in FIG. 1A in accordance with some examples.
Figure 6B:
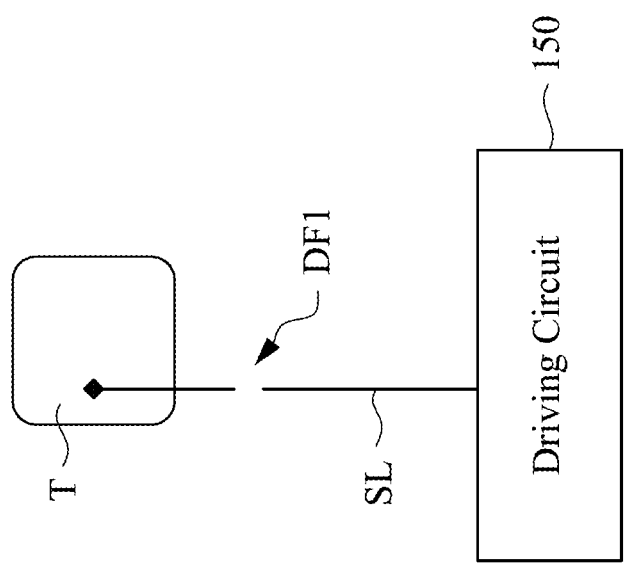
FIG. 6B illustrates an open circuit defect in the touch display panel in FIG. 1A in accordance with some examples.

FIG. 6B illustrates an open circuit defect in the touch display panel 100 in accordance with some examples. In FIG. 6B, the signal line SL connected between the driving circuit 150 and the touch sensing pad T is broken at the defect location DF1. In this case, because the circuit from the driving circuit 150 to the touch sensing pad T is open and has a smaller impedance, the detected signal from the signal line SL has a shorter charge time, and the timing graph of the detected signal may be similar to the curve 620 shown in FIG. 6A.

FIG. 6C illustrates a short circuit defect in accordance with some examples. In FIG. 6C, the signal line SL1 connected between the driving circuit 150 and the touch sensing pad T1 and the signal line SL2 connected between the driving circuit 150 and the touch sensing pad T2 are shorted at the defect location DF2 (e.g. by a conductive substance). In this case, because the circuit from the driving circuit 150 to the touch sensing pad T1 and the circuit from the driving circuit 150 to the touch sensing pad T2 are shorted, the detected signal from each of the signal lines SL1 and SL2 is not stable and is lower than the listening voltage $V_L$ in a majority of time, and the timing graph of the detected signal may be similar to the curve 630 shown in FIG. 6A.

The operation of determining whether an open circuit or a short circuit exists in the touch display panel 100 from the detected signal in Step S520 may be implemented by introducing a count value range and a sampling time interval. The count value range and the sampling time interval may be predetermined according to the characteristics of the touch display panel 100 and the driving circuit 150. At the beginning of the listening stage, the signal processor 156 initiates a count value to 0. During the listening stage, the signal processor 156 samples the detected signal at the sampling time interval. If the sampled value is substantially lower than the listening voltage $V_L$, the signal processor 156 increments the count value by 1. The signal processor 156 may compare the count value with the count value range at the end of the listening stage to determine whether the touch display panel 100 has a defect. In particular, if the count value is smaller than the lower bound of the count value range, the signal processor 156 determines that an open circuit exists in the touch display panel 100; if the count value is larger than the upper bound of the count value range, the signal processor 156 determines that a close circuit exists in the touch display panel 100. Because the detected signal is obtained from a particular signal line SL, the signal processor 156 may locate the abnormal touch sensing pad in the touch active area 100A when determining that the touch display panel 100 has a defect.

Figure 7B:
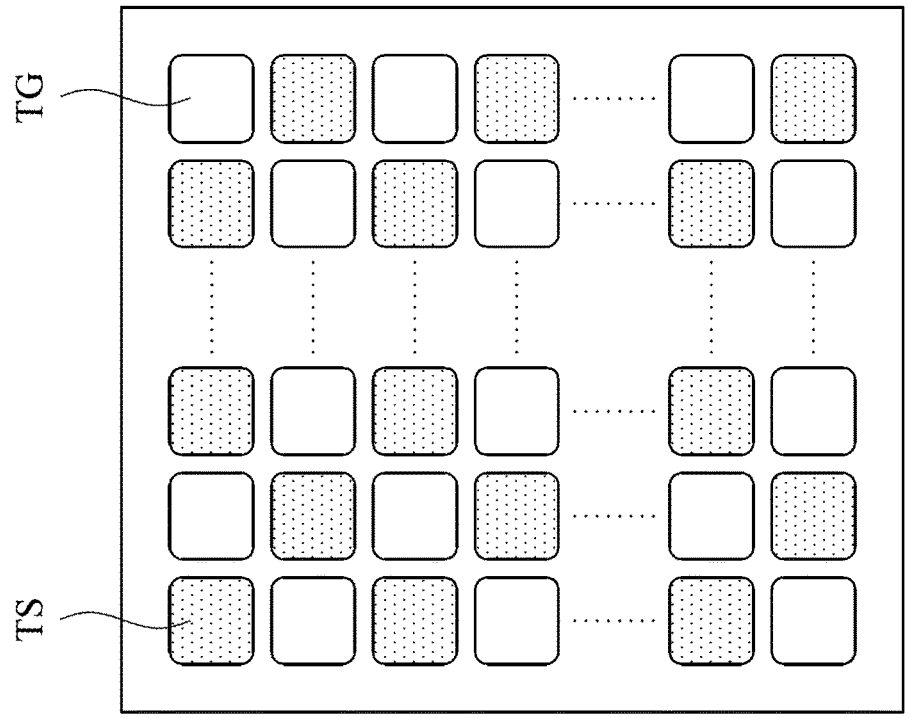
FIGS. 7A and 7B illustratively show various phases of the touch sensing pads in FIG. 1B for defect detection.
Figure 7A:
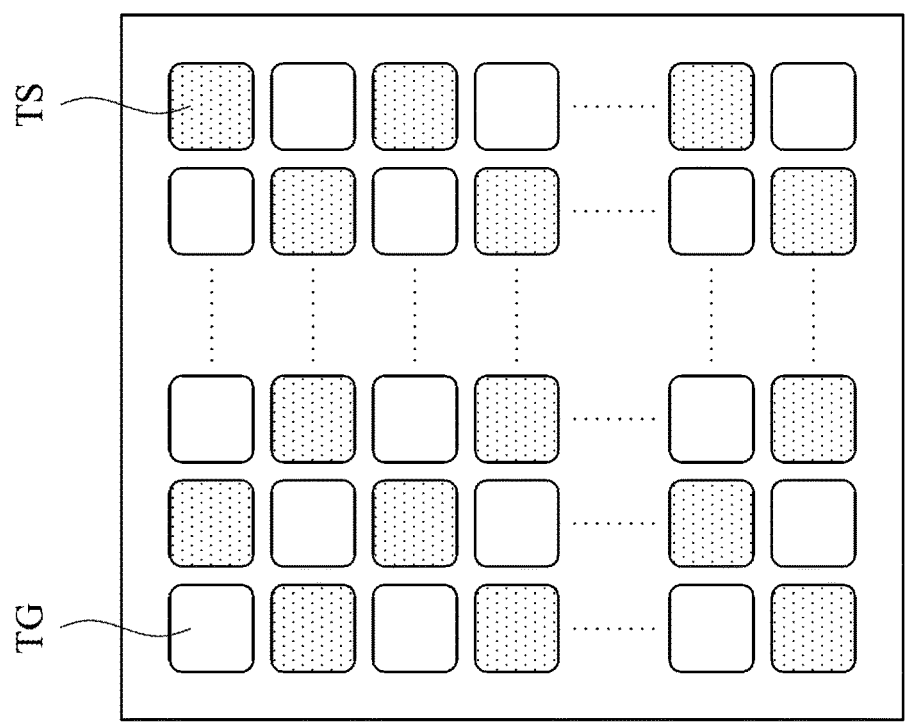

The touch sensing pads T(1,1)-T(M,N) may be configured for defect detection at different times. In some embodiments, the touch sensing pads T(1,1)-T(M,N) in the touch active area 100A are configured for defect detection in two phases. In the first phase, as shown in FIG. 7A, the voltage signal VS may be transmitted to the touch sensing pads in the odd rows and in the odd columns and the touch sensing pads in the even rows and in the even columns (also labeled as listening pads TS), and the touch sensing pads in the odd rows and in the even columns and the touch sensing pads in the even rows and in the odd columns (also labeled as grounded pads TG) may be grounded. Oppositely, in the second phase, as shown in FIG. 7B, the touch sensing pads in the odd rows and in the odd columns and the touch sensing pads in the even rows and in the even columns (also labeled as grounded pads TG) may be grounded, and the voltage signal VS may be transmitted to the touch sensing pads in the odd rows and in the even columns and the touch sensing pads in the even rows and in the odd columns (also labeled as listening pads TS). For each phase shown in FIGS. 7A and 7B, the listening pads TS are arranged in a checkerboard fashion for further improving detection accuracy.

Figure 8:
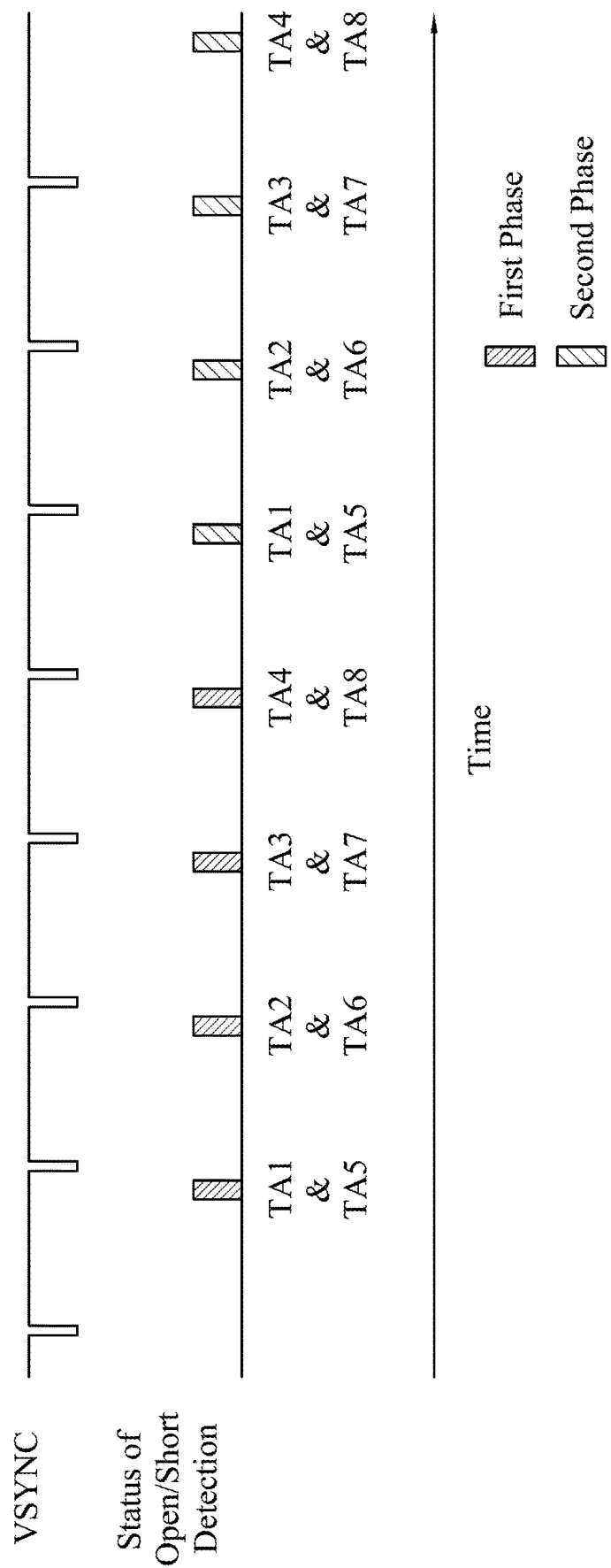
FIG. 8 is a timing diagram of the defect detection of the touch display apparatus in FIG. 1A in accordance with some embodiments of the invention.

FIG. 8 is a timing diagram of the defect detection of the touch display apparatus 10 in accordance with some embodiments of the invention. In such embodiments, the defect detection for all the touch sensing pads T(1,1)-T(M, N) are performed in eight consecutive frame periods, the touch active area 100A are partitioned to the subareas TA(1)-TA(8) shown in FIG. 3, and the touch sensing pads T(1,1)-T(M,N) in the touch active area 100A are configured for defect detection in two phases respectively shown in FIGS. 7A and 7B. The first phase is from the first frame period to the fourth frame period, while the second phase is from the fifth frame period to the eighth frame period.

Also referring to FIG. 3 and FIG. 7A, in the first frame period, only the listening pads TS in the first subarea TA(1) and in the fifth subarea TA(5) are configured for defect detection. That is, the voltage signal VS with a test pattern is transmitted only to the listening pads TS in the first subarea TA(1) and in the fifth subarea TA(5) in the first frame period. Similarly, in the second frame period, only the listening pads TS in the second subarea TA(2) and in the sixth subarea TA(6) are configured for defect detection; in the third frame period, only the listening pads TS in the third subarea TA(3) and in the seventh subarea TA(7) are configured for defect detection; in the fourth frame period, only the listening pads TS in the fourth subarea TA(4) and in the eighth subarea TA(8) are configured for defect detection.

Also referring to FIG. 3 and FIG. 7B, in the fifth frame period, only the listening pads TS in the first subarea TA(1) and in the fifth subarea TA(5) are configured for defect detection. That is, the voltage signal VS with a test pattern is transmitted only to the listening pads TS in the first subarea TA(1) and in the fifth subarea TA(5) in the fifth frame period. Similarly, in the sixth frame period, only the listening pads TS in the second subarea TA(2) and in the sixth subarea TA(6) are configured for defect detection; in the seventh frame period, only the listening pads TS in the third subarea TA(3) and in the seventh subarea TA(7) are configured for defect detection; in the eighth frame period, only the listening pads TS in the fourth subarea TA(4) and in the eighth subarea TA(8) are configured for defect detection.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A touch display apparatus, comprising:
   a touch display panel configured for display and touch sensing, wherein the touch display panel comprises a plurality of touch sensing pads; and
   a driving circuit coupled to the touch display panel, wherein the driving circuit is configured to provide a voltage signal with a test pattern to the touch sensing pads, and is configured to determine whether an open circuit or a short circuit exists in the touch display panel from a detected signal in response to the voltage signal;
   wherein the driving circuit is configured to sample the detected signal at a sampling time interval to obtain sampled values, and to determine whether an open circuit or a short circuit exists in the touch display panel by comparing the sampled values with a listening voltage;
   wherein the driving circuit determines that an open circuit exists in the touch display panel if a number of sampled values lower than the listening voltage is smaller than a lower bound of a count value range;
   wherein the driving circuit determines that a short circuit exists in the touch display panel if the number of sampled values lower than the listening voltage is larger than an upper bound of the count value range.

2. The touch display apparatus of claim 1, wherein the driving circuit determines that an open circuit exists in the touch display panel if a voltage level of the detected signal rises faster than a normal condition of the touch display panel.

3. The touch display apparatus of claim 1, wherein the driving circuit determines that a short circuit exists in the touch display panel if a voltage level of the detected signal rises slower than a normal condition of the touch display panel and does not keep at a listening voltage.

4. The touch display apparatus of claim 1, wherein the driving circuit is configured to provide the voltage signal with the test pattern to the touch sensing pads after normal touch sensing operations on the touch display panel in the same frame period.

5. The touch display apparatus of claim 1, wherein the driving circuit is configured to provide the voltage signal with the test pattern to a first group of the touch sensing pads and provide a ground signal to a second group of the touch sensing pads in a first frame period, and to provide the ground signal to the first group of the touch sensing pads and provide the voltage signal with the test pattern to the second group of the touch sensing pads in a second frame period.

6. The touch display apparatus of claim 1, wherein the touch display panel is an in-cell type touch display panel.

7. The touch display apparatus of claim 1, wherein the driving circuit is a touch and display driving integration (TDDI) circuit.

8. A driving circuit adapted to drive a touch display panel with a plurality of touch sensing pads, the driving circuit comprising:
   a voltage signal generator configured to provide a voltage signal with a test pattern to the touch sensing pads;
   a detector configured to obtain a detected signal in response to the voltage signal; and
   a signal processor configured to determine whether an open circuit or a short circuit exists in the touch display panel from the detected signal;
   wherein the signal processor is configured to sample the detected signal at a sampling time interval to obtain sampled values, and to determine whether an open circuit or a short circuit exists in the touch display panel by comparing the sampled values with a listening voltage;
   wherein the signal processor determines that an open circuit exists in the touch display panel if a number of sampled values lower than the listening voltage is smaller than a lower bound of a count value range;

wherein the signal processor determines that a short circuit exists in the touch display panel if the number of sampled values lower than the listening voltage is larger than an upper bound of the count value range.

9. The driving circuit of claim 8, wherein the signal processor determines that an open circuit exists in the touch display panel if a voltage level of the detected signal rises faster than a normal condition of the touch display panel.

10. The driving circuit of claim 8, wherein the signal processor determines that a short circuit exists in the touch display panel if a voltage level of the detected signal rises slower than a normal condition of the touch display panel and does not keep at a listening voltage.

11. The driving circuit of claim 8, wherein the voltage signal generator is configured to provide the voltage signal with the test pattern to the touch sensing pads after normal touch sensing operations on the touch display panel in the same frame period.

12. The driving circuit of claim 8, wherein the voltage signal generator is configured to provide the voltage signal with the test pattern to a first group of the touch sensing pads and provide a ground signal to a second group of the touch sensing pads in a first frame period, and to provide the ground signal to the first group of the touch sensing pads and provide the voltage signal with the test pattern to the second group of the touch sensing pads in a second frame period.

13. A method for automatic defect detection on a touch display panel with a plurality of touch sensing pads, the method comprising:

providing a voltage signal with a test pattern to the touch sensing pads;

obtaining a detected signal in response to the voltage signal; and determining whether an open circuit or a short circuit exists in the touch display panel from the detected signal;

wherein the detected signal is sampled at a sampling time interval to obtain sampled values, and the sampled values are compared with a listening voltage;

wherein an open circuit is determined to exist in the touch display panel if a number of sampled values lower than the listening voltage is smaller than a lower bound of a count value range;

wherein a short circuit is determined to exist in the touch display panel if the number of sampled values lower than the listening voltage is larger than an upper bound of the count value range.

14. The method of claim 13, wherein an open circuit is determined to exist in the touch display panel if a voltage level of the detected signal rises faster than a normal condition of the touch display panel.

15. The method of claim 13, wherein a short circuit is determined to exist in the touch display panel if a voltage level of the detected signal rises slower than a normal condition of the touch display panel and does not keep at a listening voltage.

16. The method of claim 13, wherein the voltage signal with the test pattern is provided to the touch sensing pads after normal touch sensing operations on the touch display panel in the same frame period.

17. The method of claim 13, wherein in a first frame period, the voltage signal with the test pattern is provided to a first group of the touch sensing pads, and a ground signal is provided to a second group of the touch sensing pads in a first frame period;

wherein in a second frame period, the ground signal is provided to the first group of the touch sensing pads, and the voltage signal with the test pattern is provided to the second group of the touch sensing pads in a second frame period.

* * * * *